No. 877,194.  PATENTED JAN. 21, 1908.
H. HOLZWARTH.
GAS TURBINE.
APPLICATION FILED APR. 13, 1906.

2 SHEETS—SHEET 1.

Witnesses:
Elmer R. Shipley.
M. S. Belden

Hans Holzwarth
Inventor
by James W. See
Attorney

No. 877,194. PATENTED JAN. 21, 1908.
H. HOLZWARTH.
GAS TURBINE.
APPLICATION FILED APR. 13, 1906.
2 SHEETS—SHEET 2.
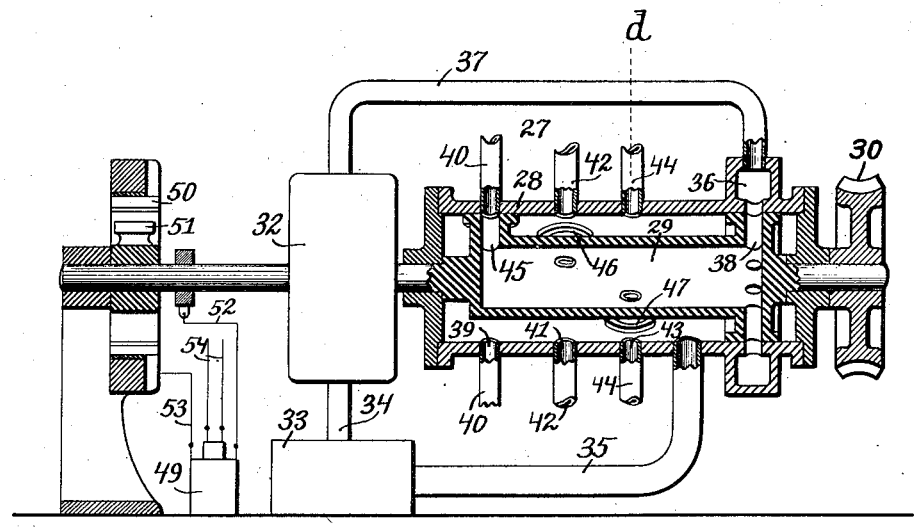
Fig. 4.
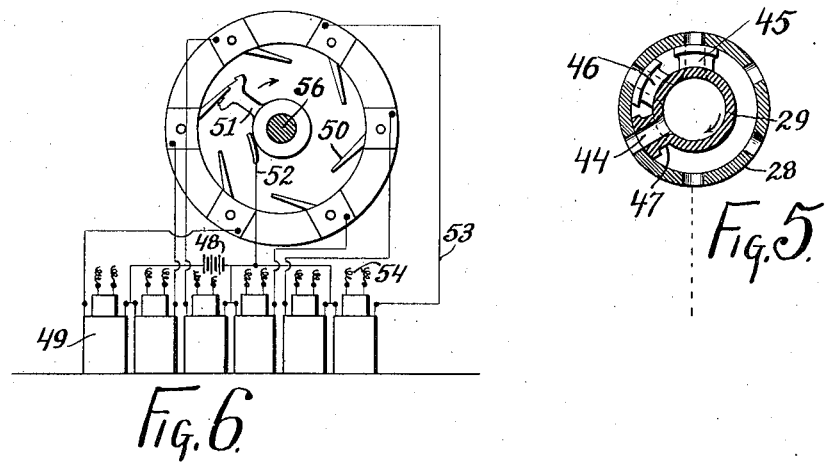
Fig. 6.
Fig. 5.
Witnesses:
Elmer R. Shipley.
M. S. Belden.
Hans Holzwarth
Inventor
by James W. See
Attorney

UNITED STATES PATENT OFFICE.

HANS HOLZWARTH, OF HAMILTON, OHIO, ASSIGNOR OF ONE-HALF TO ERHARD JUNGHANS, SR., OF SCHRAMBERG, GERMANY.

GAS-TURBINE.

No. 877,194.     Specification of Letters Patent.     Patented Jan. 21, 1908.

Application filed April 13, 1906. Serial No. 311,425.

*To all whom it may concern:*

Be it known that I, HANS HOLZWARTH, a citizen of Germany, residing at Hamilton, Butler county, Ohio, have invented certain new and useful Improvements in Gas-Turbines, of which the following is a specification.

This invention, pertaining to improvements in gas turbines, will be readily understood from the following description taken in connection with the accompanying drawings in which:—

Figure 1:
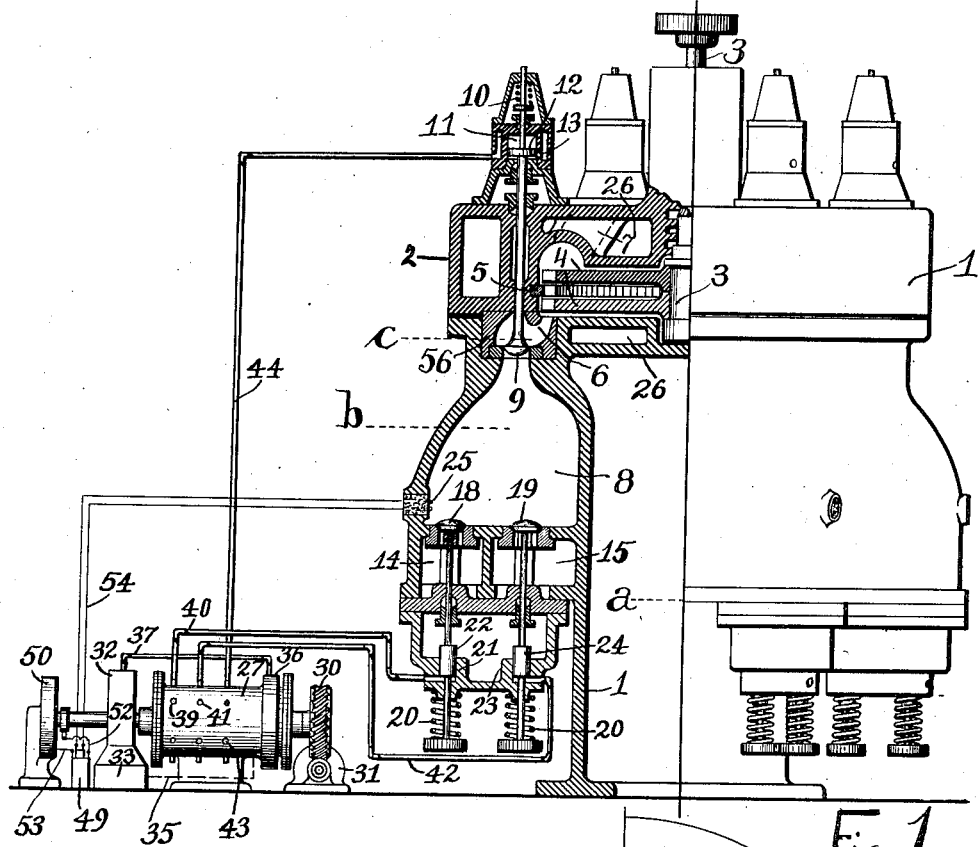
Figures 2, 3:
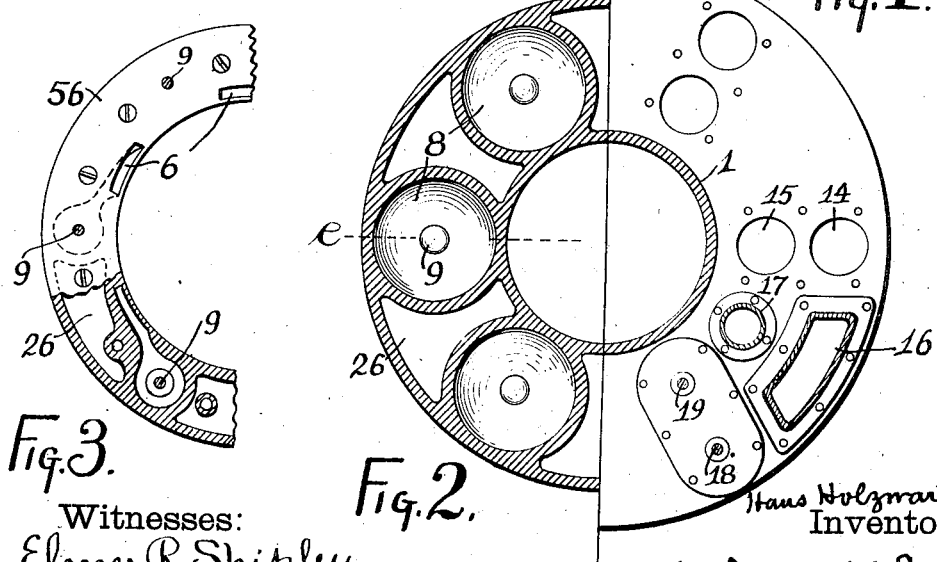

Figure 1 is a side elevation, part vertical section, in the plane of line e, Fig. 2, of a gas turbine embodying an exemplification of my invention: Fig. 2 a bottom view, part section in the plane of lines a and b: Fig. 3 a plan of a portion of the nozzle ring, part section in the plane of line c, Fig. 1: Fig. 4 a vertical longitudinal section on an enlarged scale of the controller: Fig. 5 a transverse section of the controller in the plane of line d, viewed from the right of Fig. 4: and Fig. 6 a face view of the interrupter, viewed from the right of Fig. 4.

In my improved turbine the gases are exploded in a circular series of combustion chambers in succession. As the explosion takes place in a given combustion chamber it blows open a valve and the expanding products, under high pressure, jet through a nozzle and act directly on the turbine. After the valve has been blown open by the explosion a retarding device holds it open for a period so as to permit the constantly lessening pressure of the gases to effectively jet from the nozzle, and for a still further period to permit the incoming charge of fresh air to blow out and cleanse the combustion chamber. The new charge of air is injected into the combustion chamber under pressure and, after cleansing the combustion chamber and after the valve leading to the nozzle has closed, the gas is injected into the charge of air, after which, the air and gas inlet valves having closed, the charge is exploded in the combustion chamber. A number of the combustion chambers are arranged in circular series so that their nozzles act directly upon the turbine, the effect of the individual nozzles being intermittent, but the general effect upon the turbine being practically continuous. The air and gas injected into the combustion chambers are received from annular chambers separated from the combustion chambers by a comparatively thin septum so that the gas and air may readily absorb heat from the combustion chambers.

In the drawings, giving present attention to Fig. 1:—1, indicates main frame work: 2, turbine casing: 3, turbine shaft: 4, turbine rotor, illustrated as with two disks of ordinary axial flow turbine type: 5, turbine stator vanes supported by the casing between the rotor elements: 6, a circumferential series of nozzles in position to deliver fluid to the initial member of the rotor: 7, exhaust connection from the turbine casing at the terminal side of the rotor: 8, a circumferential series of combustion chambers, one chamber for each of the nozzles 6: 9, a valve, herein termed the combustion valve, one for each combustion chamber, seating toward the combustion chamber between it and its nozzle and normally closing communication between the combustion chamber and its nozzle, the parts complementary to the combustion chambers being, for the purpose of simplifying the description, hereinafter referred to generally in the singular: 10, spring holding the combustion valve normally closed: 11, combustion valve cylinder: 12, piston within this cylinder and connected with the combustion valve: 13, port in the wall of the cylinder, normally closed by the piston and opening when the combustion valve opens: 14, air passage communicating with all of the combustion chambers: 15, gas passage similarly communicating with all of the combustion chambers: 16, (Fig. 2) air inlet to the air passage, to communicate with a source of supply of air under pressure: 17, (Fig. 2) gas inlet to the gas passage, this inlet to communicate with a source of supply of gas under pressure greater than that of the air: 18, air valve normally closing communication between the air passage and the combustion chamber: 19, gas valve normally closing communication between the combustion chamber and the gas passage: 20, springs holding the air valve and gas valve normally closed: 21, air valve cylinder: 22, piston in this cylinder, connected with the air valve: 23, gas valve cylinder: 24, piston in this cylinder, connected with the gas valve: 25, igniter in the combustion chamber: and 26, various cooling spaces about the apparatus.

The air and gas supply are to be brought to the machine under sufficient pressure to insure its proper prompt flow. Oil admitted under piston 22 opens air valve 18 and admits a charge of air to the combustion chamber the valve then closing; the first effect of the incoming air is to blow out and cleanse the combustion chamber; oil admitted under piston 24 opens gas valve 19 and admits a charge of gas, to commingle with the air, into the combustion chamber, the valve then closing; the igniter operates and explodes the charge; oil under pressure stands in port 13 ready for service; the explosive effect blows the combustion valve open; oil from port 13 enters under the combustion valve piston and holds the combustion valve open, to allow for the reducing pressure in the combustion chamber and for the cleansing operation; the products of the explosion discharging from the nozzle upon the rotor, with usual turbine action, and finally depart at the exhaust; oil is permitted to escape from under the combustion valve piston; the combustion valve reseats, the parts being ready for a repetition of the operation. The described operation takes place with the combustion chambers in succession. The opening and closing of the various valves is dominated by a controller which may, if desired, be actuated by a motor independent of the turbine.

The controller will now be described:— 27, indicates the controller as a whole; 28, controller cylinder; 29, hollow revolver turning within the cylinder; 30, worm wheel on revolver shaft; 31, motor driving the worm wheel and through it the revolver; 32, oil pump; 33, oil tank; 34, pipe from tank to pump; 35, back-flow oil pipe from controller cylinder to tank; 36, annular passage around the cylinder and communicating with it by ports; 37, pressure oil pipe from oil pump to passage 36; 38, series of necks on the revolver, fitting within the controller cylinder and serving to constantly maintain oil pressure within the revolver; 39, annular series of equally spaced ports in the wall of the controller cylinder, one port for each combustion chamber; 40, oil pipes placing the ports 39 in communication with the respective air valve cylinder 21: 41, a second similar series of ports in the controller cylinder: 42, pipes placing the ports 41 in communication with the respective gas valve cylinders 23: 43, a third annular series of ports in the controller cylinder: 44, pipes placing these ports in communication with the respective combustion valve cylinders 11 through the medium of their ports 13: 45, a hollow neck on the revolver serving, as the revolver turns, to place its interior in communication with the ports 39, successively, and thus admit air pressure to open the air valves in succession: 46, similar neck coöperating with ports 41 to open the gas valves in succession, this neck being in angular retreat of air neck 45: and 47, a similar neck coöperating with ports 43 to admit oil to the combustion valve cylinders in succession.

The oil pump maintains a constant pressure of oil within the revolver, this pressure acts upon the various valve pistons as the turning of the revolver brings the valve cylinders into communication with the interior of the revolver. As the revolver necks pass beyond their ports the valve-cylinders become placed in communication with the non-pressure space in the controller cylinder exterior to the revolver, the valve cylinders being thus relieved of pressure, the discharged oil flowing from the controller cylinder back to the oil tank.

Having reference to a given combustion chamber, the oil from the revolver goes first to open the air valve momentarily, then to open the gas valve momentarily, and then to hold the combustion valve open momentarily. The combustion valve is blown open by the explosion against the resistance of its spring, and the purpose of the oil pressure under the piston of this valve is to maintain the valve in open condition as the pressure in the explosion chamber becomes attenuated by discharge through the nozzle, and also while the first of the incoming air blows through and cleanses the combustion chamber. The explosion takes place after the air valve and gas valve have closed and the combustion chamber is charged with proper mixture. The igniter operates in harmony with the controller, the illustrated construction providing for the operation of the igniters by the motor actuating the controller.

The igniter will now be described:—48, indicates a battery: 49, induction coils, one for each combustion chamber: 50, a fixed circle of contacts: 51, an interrupting wiper turning with the controller shaft and engaging the contacts in section: 52, circuit connection from the wiper to the battery and to one terminal of the secondary of each induction coil: 53, conductors from the remaining terminals of the secondaries of the induction coils to the respective contacts 50: and 54, conductors connecting the terminals of the primary of each induction coil with the elements of the respective igniters.

After a given combustion chamber has been charged with mixture, and after its gas valve is closed, the wiper pertaining to that combustion chamber operates the igniter and explodes the charge, this action taking place as regards each combustion chamber in succession.

The passages 14 and 15 for the air and gas are in the form of annular chambers separated from the combustion chambers by a comparatively thin septum in which are located the air and gas inlet valves. The air and gas in these chambers becomes heated from the combustion chambers.

As features of specific construction to be recommended, the general frame structure 1 carries the series of combustion chambers, the turbine casing being secured against the main frame at the discharge end of the combustion chambers, as seen in Fig. 1. The nozzles are formed in a ring 56 clamped between the turbine casing and the discharge ends of the combustion chambers, this ring with all of the nozzles being removable. The construction of the nozzle ring will be understood from Fig. 3.

While I have illustrated my invention in connection with a turbine of axial flow type and having its axis disposed vertically, such features are not to be considered as essential to all realizations of my invention. The construction set forth simply illustrates the principle of my invention and the best mode in which I have contemplated applying this principle.

I claim:

1. A gas turbine comprising a casing, a rotor and stator therein, a combustion chamber having a discharge nozzle arranged to deliver the products of combustion impactively upon the rotor, a combustion valve between the combustion chamber and its discharge nozzle, said valve being adapted to be blown open by the explosion within the combustion chamber, a device for closing the valve toward the combustion chamber, means for injecting air and gas to the combustion chamber under pressure, and means for resisting the action of said valve-closing device and retarding the closing of the combustion valve while the pressure due to explosion is decreasing, combined substantially as set forth.

2. A gas turbine comprising a casing, a rotor and stator therein, an annular series of combustion chambers having discharge nozzles arranged to deliver the products of combustion impactively upon the rotor, a combustion valve between each combustion chamber and its discharge nozzle, said valves being adapted to be blown open by the explosion within the combustion chambers, devices for closing the valves toward the combustion chambers, means for injecting air and gas to the combustion chambers under pressure, means for resisting the action of said valve-closing devices and retarding the closing of the combustion valves while the pressure due to explosion is decreasing, an igniter for each combustion chamber, and a controlling device for operating the injecting devices and igniters of the several combustion chambers in succession, combined substantially as set forth.

3. A gas turbine comprising a casing, a rotor and stator therein, an annular series of combustion chambers having discharge nozzles arranged to deliver the products of combustion impactively upon the rotor, a combustion valve between each combustion chamber and its discharge nozzle, said valves being adapted to be blown open by the explosion within the combustion chambers, devices for closing the valves toward the combustion chambers, means for injecting air and gas to the combustion chambers under pressure, means for resisting the action of said valve-closing devices and retarding the closing of the combustion valves while the pressure due to explosion is decreasing, an igniter for each combustion chamber, a controlling device for operating the injecting device and igniters of the several combustion chambers in succession, and motor mechanism independent of the rotor for actuating said controlling device, combined substantially as set forth.

4. A gas engine comprising a casing containing an annular air passage, an annular gas passage, a circular series of combustion chambers adjacent said air and gas passages and having discharge nozzles, a turbine rotor arranged to receive directly the impactive discharge from said nozzles, a combustion valve disposed between each combustion chamber and its nozzle and adapted to be blown open by explosion in the combustion chambers, valves between the air and gas passages and the combustion chambers, and means for controlling the opening and closing of the air and gas valves, combined substantially as set forth.

5. A gas engine comprising a casing containing an annular air passage, an annular gas passage, a circular series of combustion chambers adjacent said air and gas passages and having discharge nozzles, a turbine rotor arranged to receive directly the impactive discharge from said nozzles, a combustion valve disposed between each combustion chamber and its nozzle and adapted to be blown open by explosion in the combustion chambers, valves between the air and gas passages and the combustion chambers, and a controller independent of the rotor for controlling the valves of the combustion chambers successively, combined substantially as set forth.

6. In a gas turbine, the combination of a rotor, a stator, a casing comprising a plurality of combustion chambers circularly arranged, a nozzle corresponding to each chamber, and a puppet combustion valve arranged to seat toward the chamber intermediate each chamber and its nozzle.

7. In a gas turbine, the combination of a rotor, a stator, a casing comprising a plurality of combustion chambers circularly arranged, a nozzle corresponding to each chamber, a puppet combustion valve arranged to seat toward the chamber intermediate each chamber and its nozzle, a valve stem extending outwardly from each valve, a cage, and a spring within the cage engaging the stem and tending to seat the valve.

8. In a gas turbine, the combination of a rotor, a stator, a casing comprising a plurality of combustion chambers circularly arranged, a nozzle corresponding to each chamber, a combustion puppet valve arranged to seat toward the chamber intermediate each chamber and its nozzle, a valve stem extending outwardly from each valve, a piston thereon, a cylinder inclosing the piston and ported below the piston when the latter is elevated, and means for applying pressure in the cylinder and retarding closing of the valve.

9. In a gas turbine, the combination of a plurality of combustion chambers annularly arranged, a gas supply chamber adjacent to all the combustion chambers, an air supply chamber adjacent to all the combustion chambers, a puppet valve for each combustion chamber connecting it with the gas supply chamber, a puppet valve for each combustion chamber connecting it with the air supply chamber, stems connected to the valves extending outwardly through the gas and air supply chambers, and springs applied to the stems urging the valves to seat, two cages inclosing the valve stems and containing cylinders, pistons on the valve stems in the cylinders, and ports entering the cylinders below the pistons for the introduction of fluid pressure to effect the opening of the valves.

10. In a gas turbine, the combination of a base containing a plurality of combustion chambers circularly arranged, a turbine casing carried by the base, a rotor and a stator carried by the turbine casing, a nozzle ring secured between the base and the casing and having nozzles adjacent to the turbine blades, and a combustion valve for each combustion chamber serving to connect it with its nozzle.

HANS HOLZWARTH.

Witnesses:
HARVEY SHULER,
EARL ROBERTS.